G. H. FAHRENBRUCH.
BRAKE HEAD.
APPLICATION FILED MAY 18, 1917.

1,247,652.

Patented Nov. 27, 1917.

Inventor:
George H. Fahrenbruch,
by Parker Cook.
Atty.

UNITED STATES PATENT OFFICE.

GEORGE H. FAHRENBRUCH, OF OMAHA, NEBRASKA.

BRAKE-HEAD.

1,247,652.

Specification of Letters Patent.

Patented Nov. 27, 1917.

Application filed May 18, 1917. Serial No. 169,407.

*To all whom it may concern:*

Be it known that I, GEORGE H. FAHRENBRUCH, a citizen of the United States, residing at Omaha, in the county of Douglas and State of Nebraska, have invented certain new and useful Improvements in Brake-Heads, of which the following is a specification.

My invention relates to a new and useful improvement in brake heads and especially to the manner in which the brake key may be securely held in said brake head when the brake shoe is in position.

In the brake heads as now in use certain openings are formed in the lugs in the head through which the key is passed and the key also passes generally through the central lug on the brake shoe. This key is simply forced in place and may easily be removed, sometimes by trainmen who either intentionally or otherwise forget to replace the same with the result that the brake shoe may be dropped or lost, permitting the brake hangers to become unhooked and in some cases letting the brake beams come down and cause derailments.

Some of the brake heads have lugs cast at their top on each side to prevent brake hangers from becoming unhooked, but when replacing a defective beam, the brake hanger and pin have to be removed, and when the key is replaced it may happen that the cotter in said key is not properly spread, from which accidents occur.

An object of my invention therefore is to provide a brake head having means formed on its inner face whereby the key that locks the brake shoe to the head will have to be tightly forced into place and cannot be removed by hand, but will necessitate the use of tools to remove the same, such as a hammer and chisel or other similar tools.

In other words, to provide any standard form of brake head with means whereby it will be necessary to have tools to remove the key, which will therefore prevent any of the trainmen from removing the key or any other persons that might wantonly remove the key if it were a simple matter of simply pulling the same out by hand.

Still another object of my invention is to provide a brake head that will correspond in all ways to the regulations set out by the Master Car Builders' Association, with the simple addition of a lug or projection cast on its inner face to force the key out of alinement so that it will take a relatively strong force to remove the same.

With these and other objects in view my invention consists in certain new and novel features and combination of parts as will be hereinafter more fully described and pointed out in the claims.

Referring to the drawings, Figure 1 is a side elevation of a brake head showing a brake shoe attached thereto and the key passing through said head and the central lug of the shoe.

Figure 1:
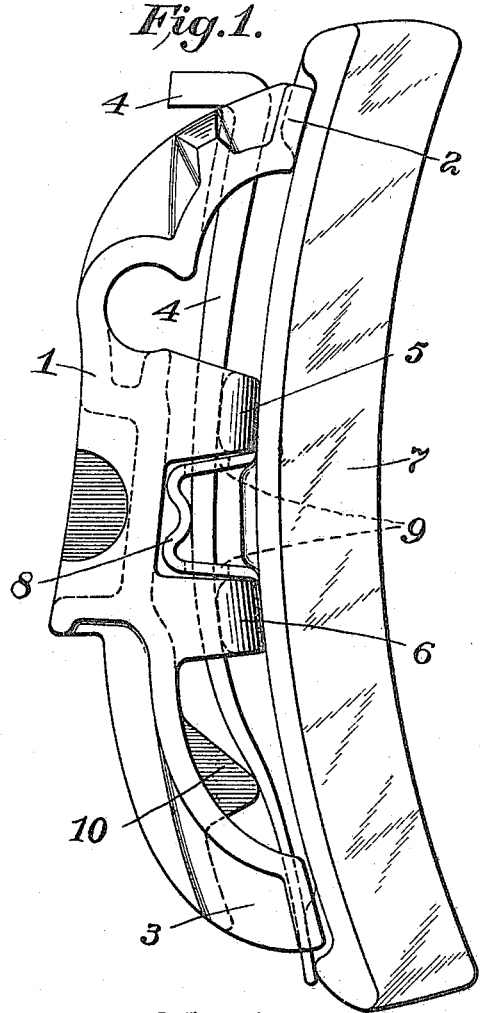

Referring now to the drawings, a brake head 1 is shown which is of any conventional type and although in this instance the head shown is the "Ajax" head, any other form of head may be formed with the additional features of my invention. The head has the upper end 2 and the lower end 3, and the said head is slightly arcuate corresponding to the contour of the brake shoe and wheels.

The upper end 2 and the lower end 3 have the usual passageways for the reception of the key 4, which also passes through openings in the lugs 5 and 6.

A brake shoe also of any conventional form 7 is shown having the central lug 8 which is provided with the openings 9 through which the key 4 passes to lock the said brake shoe 7 to the head 1. The openings in the lugs 5 and 6, and the openings in the central lug, as well as the openings in the end of the brake head are such that the key is slightly bent out of alinement or curved when forced therethrough, so as to prevent the key from jarring or rattling or working out of the central lug and brake head, but although the key is bent it is easy to remove the same and they have even been lost in service.

Figure 2:
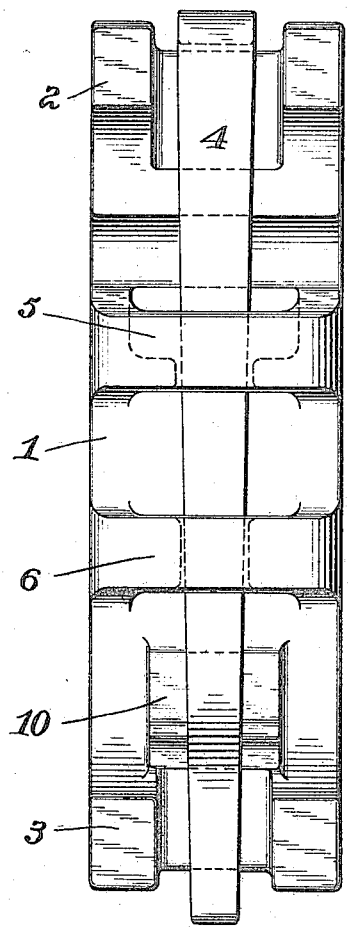
Fig. 2 is an inner face view of the brake head with the brake shoe removed.
Figure 3:
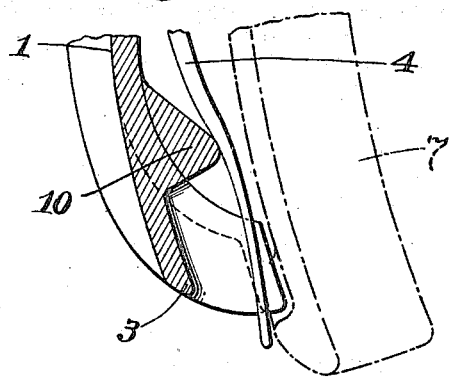
Fig. 3 is a fragmentary vertical section of the lower portion of the brake head.

Referring now to the gist of my invention, it will be seen that on the inner face and near the lower end of the brake head 1, a projecting lug 10 is formed and preferably integral with the brake head, as it may be easily done when the head is cast. This lug 10 extends for a portion of the way across the inner face of the brake head, as clearly shown in Fig. 2, and extends downwardly to a point beyond the arch or curve of the key. The said lug 10 slopes downwardly for some distance before the thickest part of the lug is reached so that when the key is forced through the central lug and openings in the brake head, it will be directed or jammed downwardly and then will be forced slightly upwardly in the opening in the lower end of the brake head where it will again encounter the upper face of the brake shoe.

To therefore force the key 4 into its position the lower part of the key will be jammed or forced out of alinement, necessitating some force to place the same in position and also necessitating the use of a hammer and chisel behind the head of the key to remove the same; in other words, making it impossible to remove the key by simply pulling it out with the hand.

By providing a structure of this kind, it will be impossible for the key to be removed without the use of tools, and furthermore, not only will the key be prevented from coming out, but it will also be held tightly in proper place, which will also protect the brake hanger so that it cannot become unhooked. Again, the improvement is one that is cheap to manufacture, easy to construct and exceedingly simple and practical in operation, and at the same time obtaining the desired functions as set out.

I am aware that certain improvements have been made on keys to try to prevent their loss and also provisions have been made on certain forms of shoes for contacting with the key, but all of which have their objections, and with the head formed as shown, any kind of shoe may be readily used.

With this form of construction it is also not necessary to have extra lugs cast on the top of the brake head to prevent it from being unhooked from the brake hanger.

Having thus described my invention, what I claim as new and desire to secure by Letters Patent, is:—

1. A brake head comprising a back, ends and central lugs having openings formed in the said ends and through the central lugs and an integral lug formed on the inner face of said brake head to project below a plane passed through the openings of the central lugs formed in said brake head.

2. A brake head comprising an arcuate formed back having openings formed in its ends, two centrally formed lugs also provided with openings and a lug formed on the inner face of the back of said brake head to thereby force a key out of alinement when the same is passed through the openings in said brake head and in said centrally formed lugs.

3. A brake head provided with downwardly extending centrally located lugs having openings therethrough, and a lug formed on the inner faces of said brake head, said lug extending downwardly beyond a plane drawn parallel with the openings formed in said centrally located lugs to thereby force the end of a key downwardly when passed through the openings in the lugs formed in said brake head.

4. The combination of a brake head and key, said brake head provided with means near its lower end for forcing said key downwardly when said key is passed through said brake head.

5. The combination of a brake head and key, said brake head having a lug formed integral therewith and on its inner face for forcing the said key downwardly when the same is passed therethrough and said lug presenting a downwardly slanting surface to said key when said key contacts therewith.

6. The combination of a brake head, a brake shoe and key, said key passing through said brake head and through a central lug on said brake shoe, a lug formed on the inner face of said brake head for forcing said key downwardly and out of alinement and the end of said key thereby being forced tightly against the lower end of said brake shoe.

In testimony whereof I affix my signature.

GEORGE H. FAHRENBRUCH.